United States Patent
Ougier et al.

(10) Patent No.: US 11,279,060 B2
(45) Date of Patent: Mar. 22, 2022

(54) APPARATUS AND METHOD FOR EXTRUDING RUBBER MIXTURES

(71) Applicant: COMPAGNIE GENERALE DES ETABLISSEMENTS MICHELIN, Clermont-Ferrand (FR)

(72) Inventors: Christophe Ougier, Clermont-Ferrand (FR); Arnaud Letocart, Clermont-Ferrand (FR)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 0 days.

(21) Appl. No.: 16/064,801

(22) PCT Filed: Dec. 21, 2016

(86) PCT No.: PCT/FR2016/053623
§ 371 (c)(1),
(2) Date: Jun. 21, 2018

(87) PCT Pub. No.: WO2017/109419
PCT Pub. Date: Jun. 29, 2017

(65) Prior Publication Data
US 2018/0370074 A1 Dec. 27, 2018

(30) Foreign Application Priority Data
Dec. 22, 2015 (FR) ...................................... 1563085

(51) Int. Cl.
*B29C 48/49* (2019.01)
*B29B 7/20* (2006.01)
(Continued)

(52) U.S. Cl.
CPC .............. *B29B 7/20* (2013.01); *B29B 7/7466* (2013.01); *B29B 7/7495* (2013.01); *B29C 48/21* (2019.02);
(Continued)

(58) Field of Classification Search
CPC ........... B29B 7/20; B29C 47/06; B29C 47/36; B29C 47/40; B29C 47/065; B29C 47/56; B29C 48/16; B29C 48/49
See application file for complete search history.

(56) References Cited

U.S. PATENT DOCUMENTS 5,000,900 A * 3/1991 Baumgartner .......... B29B 7/482
264/211.23
5,076,777 A 12/1991 Schmitt
(Continued)

FOREIGN PATENT DOCUMENTS

DE 296 04 647 U1 6/1996
EP 0 091 705 A1 10/1983
(Continued)

OTHER PUBLICATIONS

James Stevenson, Extrusion of Rubber and Plastics (Specialty Polymers & Polymer Processing), Elsevier Ltd, vol. 7, p. 303-354 (Year: 1996).*

*Primary Examiner* — Matthew J Daniels
*Assistant Examiner* — Shibin Liang
(74) *Attorney, Agent, or Firm* — Venable LLP

(57) ABSTRACT

An extrusion apparatus intended for the manufacture of a coextruded profiled element P for tyres, produced from rubber compounds of various compositions, comprises a profiling device (30) arranged at the outlet of at least two flow channels (34, 35) for rubbery compounds of different composition. The said channels receive the compounds from positive-displacement contrarotating twin-screw extruders (Continued)

(10, 20), the screw flights interpenetrating and having conjugated profiles.

11 Claims, 3 Drawing Sheets

(51) Int. Cl.
- *B29C 48/21* (2019.01)
- *B29C 48/39* (2019.01)
- *B29C 48/385* (2019.01)
- *B29C 48/40* (2019.01)
- *B29B 7/74* (2006.01)
- *B29C 48/41* (2019.01)

(52) U.S. Cl.
CPC ............ *B29C 48/385* (2019.02); *B29C 48/39* (2019.02); *B29C 48/40* (2019.02); *B29C 48/402* (2019.02); *B29C 48/41* (2019.02); *B29C 48/49* (2019.02); *B29C 2948/92885* (2019.02)

(56) References Cited

U.S. PATENT DOCUMENTS

| | | | |
|---|---|---|---|
| 5,711,904 A * | 1/1998 | Eswaran | B29C 67/246 264/40.7 |
| 5,725,814 A | 3/1998 | Harris | |
| 2012/0043687 A1 * | 2/2012 | Kirchhoff | C01B 5/00 264/141 |
| 2012/0150299 A1 | 6/2012 | Ergun et al. | |
| 2017/0001360 A1 * | 1/2017 | Dyrlund | B29C 48/07 |
| 2019/0152116 A1 * | 5/2019 | Dyrlund | B29D 30/52 |

FOREIGN PATENT DOCUMENTS

| | | | | |
|---|---|---|---|---|
| EP | 1002633 A2 * | 5/2000 | ........... | B29C 48/397 |
| JP | 10-15940 A | 1/1998 | | |
| JP | 4535884 B2 | 9/2010 | | |
| WO | 2015/028166 A1 | 3/2015 | | |

* cited by examiner

APPARATUS AND METHOD FOR EXTRUDING RUBBER MIXTURES

FIELD OF THE INVENTION

The invention relates to the field of the extrusion of rubber compounds more particularly intended for the manufacture of tires. More particularly, it relates to the manufacture of a coextruded profiled element based on rubber compounds of various compositions.

RELATED ART

In the known way, an apparatus for the manufacture of complex profiled elements by the extrusion of at least two rubber compounds of different compositions, or coextrusion, comprises at least two extruders. Each extruder is formed of a cylindrical body or barrel which is stationary, inside which there is a screw coaxial with the longitudinal axis of the barrel and driven in rotation about this axis. Its purpose is to homogenize a rubber compound and drive it towards an outlet orifice. For a complex product, the outlet orifice receives several rubber compounds of various compositions and defines the profile of the rubber strip. This profile is defined by a fixed profiled blade or a fixed profiled wall collaborating with a rotary roller.

Tire manufacture increasingly calls for the use of complex products in order to reduce the number of product-laying operations during tire building and thus reduce costs and improve precision.

The number of different rubbery compounds used in manufacturing a single tire is tending to increase, so as to be able to improve the properties of the tire according to the region in which these compounds are located. For example, at the present time, a tire tread which in general comprised two different rubbery compounds, has added to it other compounds, for example an electrically conducting compound and compounds intended to cover the sidewalls in the shoulder regions.

During manufacture by coextrusion, the compounds are made to converge towards the outlet orifice which means that bonding is made to occur in the raw state, at the pressure and temperature of the compounds, without contact with the open air and prior to profiling. This makes it possible to obtain good integrity of the coextruded product in the region of interfaces between the compounds. Now, because of the rheological properties which differ from one compound to another, it is difficult to gain perfect control over the geometry of the assembly, notably as a result of the difficulty there is in positioning a product made from a certain compound in relation to another.

The positioning of one product in relation to another is dictated by a profiling device in which the various compounds coming from the various extruders arrive in order to form the coextruded complex profiled element at output. In practice, the geometrical shape and the dimensions of the profiling device are determined by several successive iteration loops. Once the device has been optimized, it yields the anticipated results only when the extruders are operating in steady-state and at a clearly determined speed.

The non-compliant coextruded profiled element currently represents a non-insignificant proportion of the production output of the machine. The shorter the production runs with a view to achieving flexible production, the higher the scrappage rates (5% to 20% in practice). This results in a drop in the profitability of the machine. Moreover, because material wastage is economically unacceptable, scrap referred to as mixed (or multi-compound) scrap has to be stored, re-homogenized, and reintroduced in a controlled, precisely metered manner, into subsequent production runs. The production on-cost that that generates is furthermore accompanied by a drop in the performance of the product ultimately obtained which is in part contaminated with the other compounds.

Furthermore, the coextruded product is continuously checked, by measuring the linear weight of the product being output and comparing it against a preestablished weight. In addition, the shape and dimensions of the complex product (width, thickness) are evaluated using various sensors.

Thus, known document WO 2015/028166 describes a method of manufacturing a tire tread by the coextrusion of various compounds coming from several extruders arranged in parallel, in which method the transverse profile is analyzed by contactless sensors. The profile of each part that makes up the tread is read by a sensor, the profiles then being analyzed by a central control unit which controls the operation of each extruder. The operation of an extruder is set up by adjusting the rotational speed of the screw and the pressure at the end of the screw just before the outlet. However, its operation is also dependent on the compound having been brought to the correct temperature, on the die having been brought to the correct temperature, on the extrusion rate, on the rheology of the compound, on disruptions to the strip feed, etc. All of these factors disturb the throughput of the extruder, which means that numerous settings-up are required before a compliant product can be obtained.

Moreover, the measurements taken with optical sensors are still not enough to guarantee correct positioning of the various constituent parts relative to one another within the complex product, nor to visualize their respective interfaces, especially when they are superposed. As a result, a final check is made by taking samples. The samples taken during all of this optimization work cannot be recycled because this is a composite assembly, and they are discarded, generating wastage of material and increasing the overall cost of the products obtained.

Also known is document U.S. Pat. No. 5,725,814 which describes an arrangement of several extruders each one comprising a gear pump at outlet to produce a complex product based on various plastics materials. Such an arrangement makes it possible to use a setup based on adjusting the speed of the pump in order to vary the proportion of one material relative to another during manufacture of the complex. The major disadvantage with such a solution is the significant bulk of the gear pump, which has a direct impact on the size of the shaping tooling, especially when the number of paths is greater than two. The tooling is therefore expensive, difficult to handle, and it takes longer to achieve the correct temperature.

An aim of the invention is to overcome these drawbacks.

SUMMARY OF THE INVENTION

This objective is achieved with an extrusion apparatus intended for the manufacture of a coextruded profiled element P for tyres, produced from rubber compounds of various compositions, comprising a profiling device arranged at the output of at least two flow channels for rubbery compounds of different composition, characterized in that the said channels receive the compounds from positive-displacement contrarotating twin-screw extruders, the screw flights interpenetrating and having conjugated profiles.

The extrusion apparatus of the invention comprises at least two independent positive-displacement contrarotating twin-screw extruders, the screw flights interpenetrating and having conjugated profiles, which extruders make it possible to convey precisely, at a controlled flow rate, two different compounds along flow channels which open into a profiling device so as to produce a complex profiled element by coextrusion. In this way, a coextruded profiled product is obtained by superposition of various compounds upon passage through the profiling device, which has a profile that is precise and repeatable over time.

More particularly, each positive-displacement twin-screw extruder, also known by the name of twin-screw pump, comprises two screws, the flights of which interpenetrate and have conjugated profiles, the screws being rotationally driven in opposite directions making it possible to convey the compound in two closed C-shaped chambers delimited by the space between each screw and the barrel. The forward progression of the chambers is by the pitch of the thread for each revolution of the screw, making it possible to have a constant flow rate which is independent of the coefficient of friction of the compound against the walls of the barrel and therefore circumvents factors such as the rheology of the compound, its pressure, its temperature, etc. Because of the specific geometry of the extruder screws, such a progression of the chambers allows volumetric feeding of the extrusion die feed channels. This means that the flow rate can easily be adjusted by adjusting the speed of each extruder, thereby ensuring stable and repetitive operation of the apparatus.

Thus, since for each constituent of the coextruded profiled element, the geometric shape is dictated by the profiling device, and the flow rate of the compound is dictated by the extruder that conveys the compound as far as the device, using a twin-screw extruder to feed each flow path or channel leading to the profiling device yields a coextruded profiled element that exhibits good precision in terms of its geometric shape and in terms of its dimensions, and does so right from the first lengths of profiled strip extruded.

According to the invention, the said twin-screw extruders are arranged in such a way that each one delivers directly into one flow channel. This makes it possible to obtain a multi-path profiling device that has an optimized value of cross section in the direction of extrusion. Specifically, the height of the cross section at entry into the flow channels into which the two compounds arriving in the direction of extrusion arrive is very small for a maximum value of the flow rate provided by the twin-screw extruders. What is more, the compound does not change direction, and this minimizes swelling of the coextruded product.

Advantageously, each twin-screw extruder is fed by a secondary, single-screw, extruder.

It is also possible to use another unit for plasticizing the compound upstream of the twin-screw extruders, such as a twin-screw mixer. However, it is preferable to use an extruder because it enables the chambers of the twin-screw extruder to be fed with compound which is fluidized and homogenized. The extruder may thus be provided with homogenizing fingers when even more work is to be input into the compound.

For preference, the twin-screw extruder and the secondary extruder are arranged in a common housing.

This allows the compound plasticized by the secondary extruder to be transferred directly to the twin-screw extruder without resorting to additional actuator and devices which would complicate the construction and increase the price of the apparatus.

Advantageously, the secondary extruder comprises an outlet end which communicates with a central inlet orifice into an internal chamber of the twin-screw extruder.

This allows compound to be fed in a balanced manner via an inlet orifice positioned along the median longitudinal axis of the twin-screw extruder.

For preference, the twin-screw extruder and the secondary extruder each have their own drive means.

In an alternative form of embodiment, use is made of a rotational-drive means common to the two extruders, because this is more economical. However, it is preferable for each extruder to be driven by independent means so that the operating parameters of each can be adjusted independently.

Advantageously, the axis of rotation of the screw of the secondary extruder is transverse to the axis of rotation of the screws of the twin-screw extruder.

Such an arrangement of the extruders with their axes perpendicular makes it possible to obtain an assembly that is compact and occupies a small amount of space. In this way, several parts of the profiling device can be fed in parallel with such extruder sets.

For preference, the apparatus comprises a control unit intended to adjust the rotational speed of the screws of the said twin-screw extruders to suit the dimensions of the coextruded profiled element.

The twin-screw extruder has a known intrinsic flow rate which is proportional to its rotational speed. The control unit allows this to be adapted to suit the dimensions of the coextruded profiled element. In an alternative form of embodiment, a weight sensor connected to the control unit continuously measures the weight of the coextruded profiled element, thereby allowing fine adjustment of the weight per meter of the profiled element.

Advantageously, the said control unit adjusts the rotational speed of the screws of the said twin-screw extruders to make it suit the operating conditions of an ancillary assembly line.

The apparatus of the invention is quite particularly advantageous in the case of the preparation of a coextruded profiled element where preparation is incorporated into assembly. In that case, the rate at which the product travels is variable because it is dependent on that of the assembly line, and operation has to alternate between phases in which the apparatus is in operation and phases in which it is stopped. The operation of the apparatus is thus adapted to suit that of the assembly line simply by controlling the speeds of the twin-screw extruders.

The objectives of the invention are also achieved with a method for the manufacture of a coextruded profiled element P for tyres, produced from rubber compounds of various compositions, by extrusion through a profiling tool coming from two compound flow channels, characterized in that it comprises a step of feeding the said channels, which is performed by positive-displacement contrarotating twin-screw extruders, the screw flights interpenetrating and having conjugated profiles.

Advantageously, the method of the invention comprises a step of adjusting the rotational speed of the screws of the twin-screw extruder to suit the dimensions of the coextruded profiled element P.

For preference, the flow rate supplied by each twin-screw extruder is greater than 20 kg/min for a speed less than or equal to 40 rpm. This makes it possible to achieve good productivity for low rotational speeds while at the same time avoiding heating up the compound.

BRIEF DESCRIPTION OF THE FIGURES

The following description is based on FIGS. 1 to 6 in which.

DETAILED DESCRIPTION OF THE INVENTION

Figure 1:
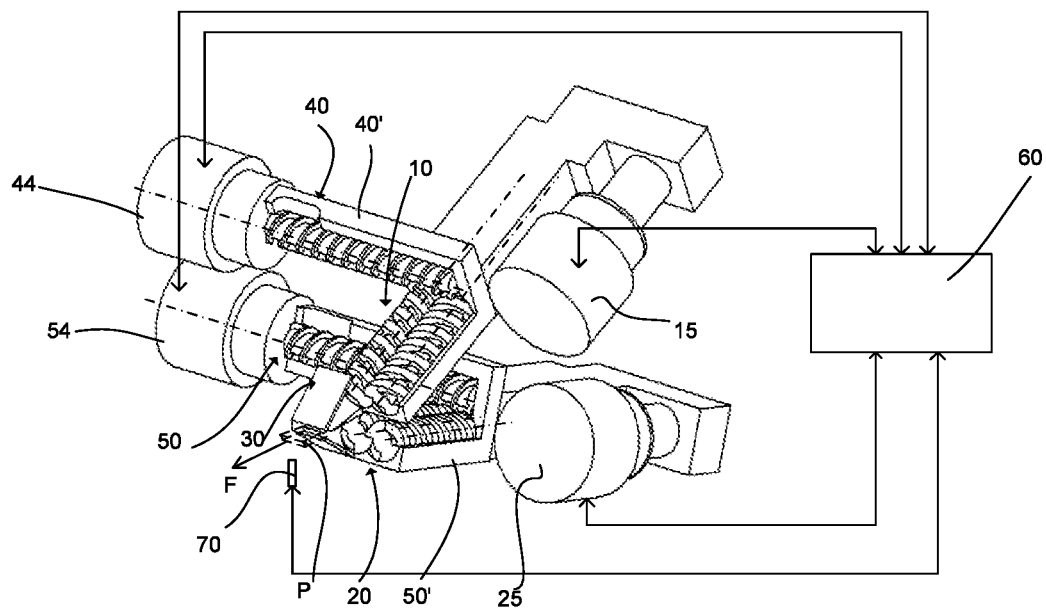
FIG. 1 schematically illustrates a perspective view of an extrusion apparatus according to one exemplary embodiment of the invention.

The extrusion apparatus depicted in FIG. 1 comprises a first secondary extruder 40 and a second secondary extruder 50, which are extruders comprising an Archimedean screw. These extruders are each equipped, at an inlet end 42, 52, respectively, with a feed chute 41, 51, respectively, feeding a raw rubber compound A and B, the two compounds having different compositions. Each secondary extruder 40, 50 comprises a screw 45, 55 rotationally driven about its longitudinal axis X-X', Y-Y' by a geared motor unit 44, 54 inside a barrel 46, 56 of circular cross section. Each rubber compound A, B is mixed, brought up to pressure and temperature, and homogenized before arriving at the outlet end 43, 53 of the extruder.

The extrusion apparatus also comprises a profiling device 30 having an extrusion orifice 31 the cross section of which gives the geometric shape to the coextruded profiled element. The profiling device for this purpose comprises an upper arch 36 and a lower arch 37 which with an intermediate support 38 delimit two flow channels 34, 35 each for one of the compounds A and B coming from the extruder 40 and from the extruded 50. The channels 34 and 35 open onto the one same extrusion orifice 31 through which the two compounds A and B are discharged. The extrusion orifice 31 is delimited by the walls of the profiling device 30 and allows the assembly made up of the coextruded compounds to be given the desired profile.

What is meant by rubber or elastomer is preferably any type of diene or non-diene elastomer, for example thermoplastic elastomer, or a blend of elastomers: natural rubber and synthetic rubber, reinforcing fillers: carbon black and silica, plasticizers: oils, resins and other chemical elements such as sulfur for example.

The extrusion installation of the invention seeks to create a coextruded profiled element based on various compounds. Such various elastomer compounds are, by way of example, the elastomer or rubber compounds used to create a tread assembly, such as: a first material made of 100% natural rubber, to create a sublayer with one, then a second material to create the tread, made of 100% synthetic rubber. It is possible to add a third or even a fourth material to create the sidewalls, this further material being made of a natural rubber/synthetic rubber compound (containing 20% to 80% natural rubber).

According to the invention, the extrusion apparatus comprises twin-screw positive-displacement extruders 10, 20 or twin-screw pumps, referred to hereinafter as twin-screw extruders, arranged between the secondary extruder 40, 50 and the profiling device 30. The twin-screw extruders are of the contrarotating type with interpenetrating flights and conjugated profiles and are arranged in such a way that each opens directly into the respective flow channel 34, 35 of the profiling device 30. Each twin-screw extruder 10, 20 is fed by a second extruder 40, 50, the outlet end 46, 56 of the latter being in communication with an inlet orifice into an internal chamber of the twin-screw extruder. The extruder 10 comprises two screws 11, 12 each one rotating about a longitudinal axis parallel to that of the flow channel 34. The extruder 20 comprises two screws 21, 22 each one rotating about a longitudinal axis parallel to that of the flow channel 35.

A twin-screw extruder is very compact for a given flow rate at a given temperature. Thus, a twin-screw extruder used in the apparatus of the invention has a diameter d for each screw 11, 12 or 21, 22 of 100 mm, a voids ratio (to be understood as meaning the ratio between the diameter of the central part and the outside diameter of the screw) close to 50%, a length-to-diameter ratio L/d equal to 4, a pitch equal to 100 mm, for a flow rate of around 22 kg/min at a speed of around 40 rpm.

Figure 4:
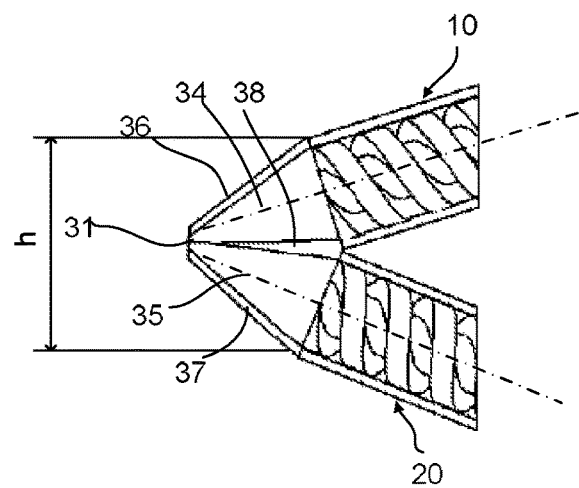
FIG. 4 is a view in section on a plane passing through the longitudinal axes of the screws of the twin-screw extruders.
Figure 6:
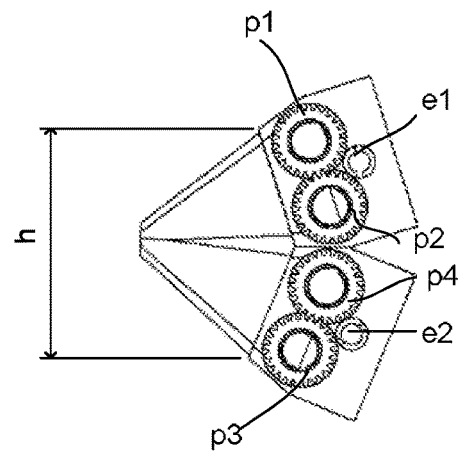
FIG. 6 is a schematic view in cross section of a profiling device fed by extruders of the prior art.
Figure 5:
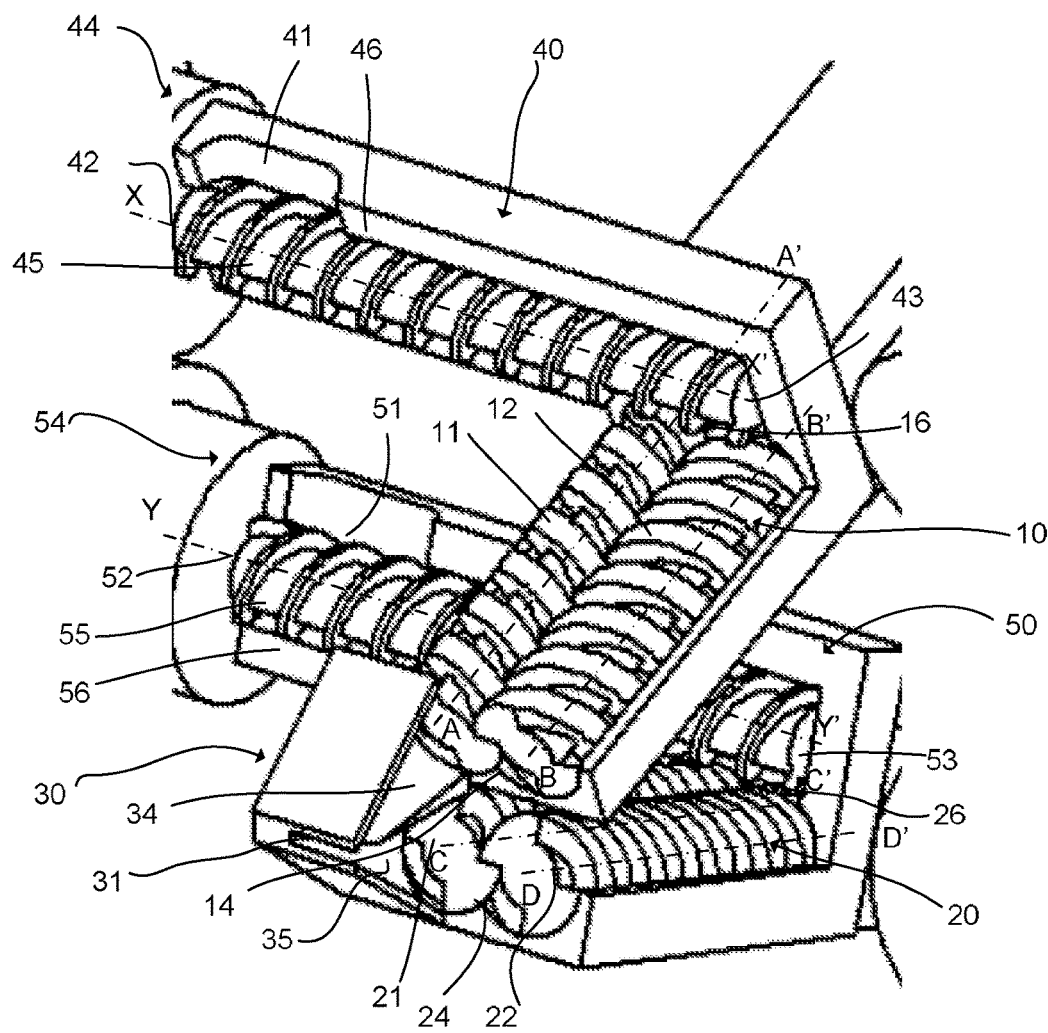
FIG. 5 is a view on a larger scale of part of the apparatus of FIG. 1.

The same is not true of a gear pump extruder of the prior art. In order to better highlight this difference, FIG. 6 illustrates a coextrusion apparatus using gear pumps of the prior art. When the solution of the invention, as visible in FIG. 4, and a gear pumps apparatus of the prior art (FIG. 6) are compared, it can be seen that, for an equivalent size "h" (which means the height of the inlet section into the flow channels into which the two compounds open in the direction of extrusion), a gear pump, fed by an extruder e1, e2 would need to have pinions p1, p2, p3, p4 of a diameter of 50 mm, and a width of 175 mm with a voids ratio of 20% maximum. A high rotational speed of 80 rpm (namely a tangential speed of 210 mm/s in the case of the twin-screw extruder) would yield only 11 kg/min. By contrast, the mean shearing would be 4 times higher and, in practice, the flow rate values would need to be limited to 5 kg/min in order to limit the heating-up which is liable to degrade or even vulcanize a raw elastomer compound. Furthermore, the gear pump implies lateral leakages or difficulty in achieving sealing at the edges of the pinions given the operating pressures. This problem is solved in the case of a twin-screw extruder since only the intake-side chamber is sealed with respect to the outside (at the geared-motor end).

Figure 2:
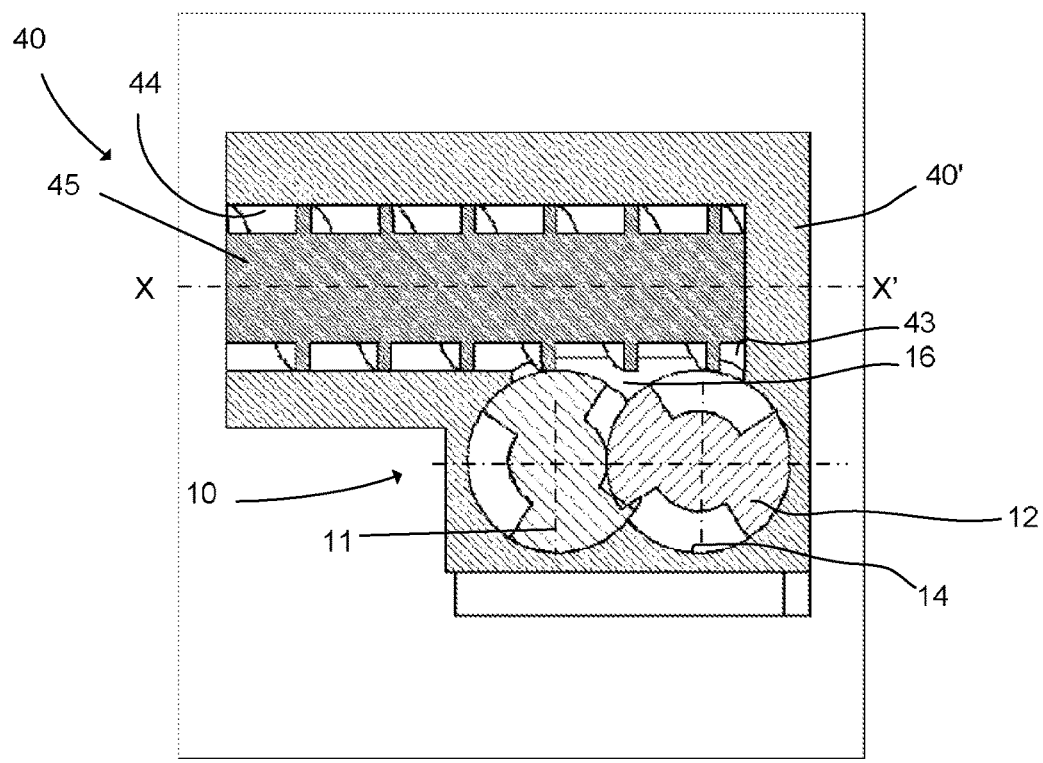
FIG. 2 is a view in section on a plane passing through the longitudinal axis X-X' of the secondary extruder (40)

More particularly, in the example illustrated in the figures, the twin-screw extruder or pump 10 comprises two screws 11, 12 with parallel axes A-A' and B-B' which, in the example described, are perpendicular to the axis X-X' of the secondary extruder 40. The screws 11, 12 are arranged side-by-side in a housing which exhibits an internal chamber 14 of figure-eight-shaped cross section (FIG. 2). The screws 11, 12 each have a flight the cross section of which is substantially rectangular and constant along the length of the screw, they are arranged in such a way as to intermesh, the profiles of the two screws 11, 12 being conjugated and constituting, with the chamber 14, the means of transferring the rubber compound at constant flow rate between a feed inlet coming from the extruder 40 and its outlet via the flow channel 34. The profiles of the screws 11 and 12 thus exhibit a very small clearance in the central region of the extruder 10, which is to be understood as meaning a region close to a median longitudinal axis passing mid-way between the axes A-A and B-B', which means that the two screws are practically sealed with respect to the compound in this region, whereas they form C-shaped chambers with the periphery of the chamber 14.

The rubbery compound arrives via a central inlet orifice 16 coming from the secondary extruder 40. The screws 11, 12 are driven in rotation about their axes A-A' and B-B' in opposite directions by a geared motor unit 15 having two output shafts each one situated in the continuation of the axes A-A' and B-B' in order to cause the rubbery compound to advance towards the outlet of the extruder 10 via which it arrives in the channel 34.

Similarly, the twin-screw extruder or pump 20 comprises two screws 21, 22 with parallel axes C-C' and D-D' which, in the example described, are perpendicular to the axis Y-Y' of the secondary extruder 50. The screws 21, 22 are arranged side-by-side in a housing which exhibits an internal chamber 24 of figure-eight-shaped cross section. The screws 21, 22 each have a flight the cross section of which is substantially rectangular and constant along the length of the screw, they are arranged in such a way as to intermesh, the profiles of the two screws 21, 22 being conjugated and constituting, with the chamber 14, the means of transferring the rubber compound at constant flow rate between a feed inlet coming from the extruder 50 and its outlet via the flow channel 35. The profiles of the screws 21 and 22 thus exhibit a very small clearance in the central region of the extruder 20, which is to be understood as meaning a region close to a median longitudinal axis passing mid-way between the axes C-C' and D-D', which means that the two screws are practically sealed with respect to the compound in this region, whereas they form C-shaped chambers with the periphery of the chamber 24. The rubbery compound arrives via a central inlet orifice 26 coming from the secondary extruder 50. The screws 21, 22 are driven in rotation about their axes C-C' and D-D' in opposite directions by a geared motor unit 25 having two output shafts each one situated in the continuation of the axes C-C' and D-D' in order to cause the rubbery compound to advance towards the outlet of the extruder 20 via which it arrives in the channel 35.

The profile and dimensions of the chambers 14, 24 respectively are designed to correspond to those of screws 11 and 12 and of screws 21 and 22, respectively. More particularly, there is a small clearance between the periphery of the flights of the screws and the chamber, this radial clearance being comprised between 0.05 to 0.2 mm.

In the example illustrated in the figures, the screws 11, 12 and 21, 22, respectively, are identical, they each have two helical flights of trapezoidal cross section and a pitch p that is constant over the length of the screw, they are arranged in such a way as to intermesh, the profiles of the two screws 11, 12 and 21, 22 being conjugated. The width of a void between two screw flight flanks is equal to the width of the flank so that a flank fits into the void of the screw opposite. By way of example, the clearance between two adjacent flanks of screws 11 and 12 is around 0.3 mm.

The C-shaped chambers formed inside the chambers 14, 24, respectively, are bounded towards the outside by the walls of the chambers 14, 24 respectively, and laterally by the flights of the screws 11 and 12, and of the screws 21 and 22, respectively. In the region in which the flights of the adjacent screws 11 and 12, and screws 21 and 22, respectively, intermesh with one another, the C-shaped chambers are separated by a sealing effect.

In an alternative form, the flights of the screws 11, 12 and 21, 22 has a pitch that is variable, the pitch in the feed zone, which communicates with the extruders 40, 50, having the smallest value.

The transfer of each elastomer compound towards the extrusion die or profiling device 30 as performed by the twin-screw extruders 10, 20 is performed at constant flow rate along the flow channels 34, 35.

The feed pressure for compound coming from one of the extruders 40, 50 is higher than atmospheric pressure and chosen to be high enough to overcome the pressure drop through the extrusion die or profiling device 30.

In an alternative form of embodiment, the feed pressure at the outlet of one or the other of the extruders 40, 50 is high enough, for example equal to around 200 bar, being chosen so as to overcome the pressure drop experienced by the compound as it passes along the flow channels 34, 35 and through the extrusion die, and is kept substantially constant by the twin-screw extruder or pump 10, 20, respectively.

In another alternative form of embodiment, the feed pressure at the outlet of one or the other of the extruders 40, 50 is lower, for example around 2 bar and the pressure at the outlet of the twin-screw extruder or pump 10, 20 respectively, is increased by the latter to around 200 bar.

In yet another alternative form of embodiment, the feed pressure is high and its outlet value is further increased by the twin-screw extruder or pump.

Figures 3A, 3B:
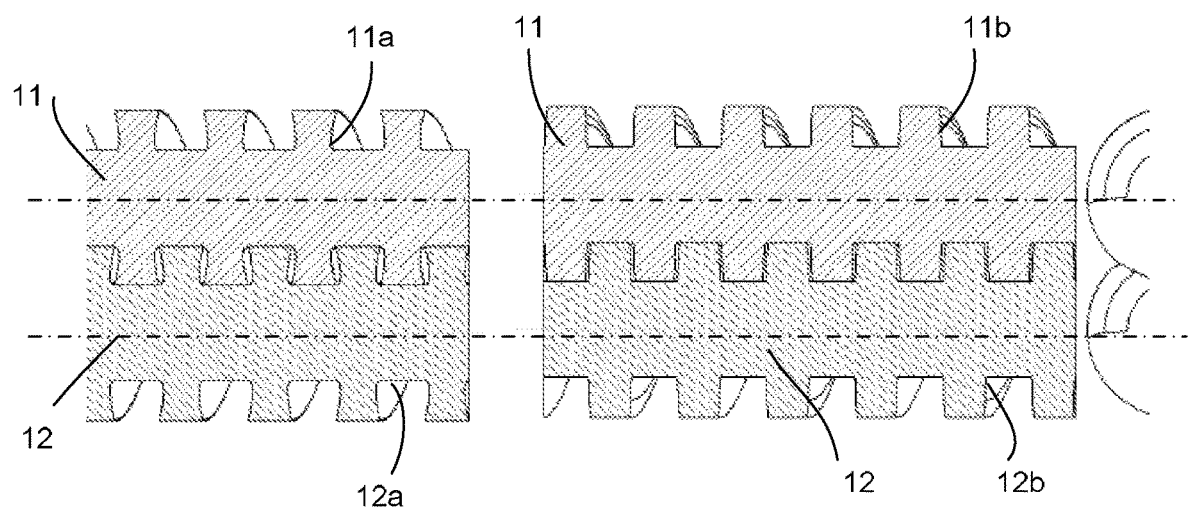
FIGS. 3a and 3b illustrate, by views in cross section, exemplary embodiments of the screws with which the twin-screw extruders of the apparatus of the invention are equipped.

FIGS. 3a and 3b illustrate two preferred embodiments of the flights of the screws of the twin-screw extruders 10, 20. The flights of the screws 11, 12 in FIG. 3a are of substantially trapezoidal shape with flanks 11a, 12a of concave shape. The flights of the screws 11, 12 in FIG. 3b are of substantially trapezoidal shape with flanks 11b, 12b of convex shape. These flights ensure better sealing of the C-shaped chambers and therefore better efficiency of the twin-screw extruder.

The screws 11, 12 and 21, 22 of the twin-screw extruders 10 and 20 are of the single-flight type or, in an alternative form of embodiment, may exhibit several flights. The flights preferably have a constant pitch. In an alternative form of embodiment, for example when an increase in pressure is desired, the pitch may be variable.

As best visible in FIG. 2, the first secondary extruder 40 and the first twin-screw extruder 10 are arranged in a common housing 40'. As a result, the secondary extruder 40 works and increases the pressure of the first compound A and then transfers it directly to the twin-screw extruder 10 via a central orifice 16. The same is true of the secondary extruder 50 and the second twin-screw extruder 20 which are arranged in a common housing 50', the pressurized compound being transmitted from the first to the second via the central orifice 26.

The two twin-screw extruders 10 and 20 are arranged in parallel by being juxtaposed (it is to be understood that they are on the same side, as viewed in relation to a vertical plane passing through the outlet orifice 31) to converge into the profiling device 30. The longitudinal axis A-A' (or respectively B-B') of the twin-screw extruder 10 makes an acute angle with the axis C-C' (or respectively D-D') of the twin-screw extruder 20. The coextruded profiled element P is obtained by coextrusion by passing two separate streams of compound, a first one coming from the positive-displacement twin-screw extruder 10 via the flow channel 34 and a second coming from the positive-displacement twin-screw extruder 20 via the flow channel 35, through the profiling device 30 passing in the direction of the arrow F and being pulled off by a motorized roller (not illustrated). In an alternative form of embodiment, the profiling device collaborates with a rotary roller (not illustrated) on which the coextruded product P is placed.

The apparatus also comprises a control unit 16 which is able to adjust the rotational speed of the screws 11, 12 and of the screws 21, 22 of the twin-screw extruders 10 and 20 according to the dimensions of the coextruded profiled element P. The dimensions of the coextruded profiled element P, notably the width and thickness, are preestablished and measured using a sensor 70, for example an optical sensor. The sensor 70 is connected to the control unit 60 to which it transmits the measurement signal so as to allow the dimensions of the profiling device to be optimized at the start of the operation. Once optimization has been achieved, the sensor 70 checks the dimensions of the coextruded profiled element and its compliance with preestablished dimensions. In an alternative form of embodiment, a weight sensor measures the weight of the coextruded profiled element P, and makes even finer adjustments to the tolerances on the coextruded product.

The control unit 60 operates the geared motor units 15 and 25 according to the desired dimensions of the coextruded profiled element P or according to the operating conditions (variable speed, stop-start conditions).

The twin-screw extruders 10 and 20 convey the compound through the peripheral C-shaped chambers in such a way that the material contained in the chambers advances by the magnitude of one pitch of the screw flight per revolution. As a result, adjustments to the rotational speed of the screws of each twin-screw extruder 10, 20 are in direct proportion with variations in its flow rate. This allows the control unit 60 to adjust the flow rate of each extruder according to dimensions of the coextruded product and also to keep it constant during operation.

The control unit 60 is also connected to the geared motor units 44 and 54 of the secondary extruders 40 and 50 and is able to control the rotational speed of the screws 42 or 52. This control is performed in synchronism with control of the geared motor units 15, 25 on the basis of experimentally preestablished relationships. In an alternative form of embodiment, the rotational speed of the screws of the secondary extruders is established on the basis of data received from pressure sensors situated in the arch of each secondary extruder.

The control unit 60 may also be connected to the pull-off means that pull off the strip of coextruded profiled element P in order to adjust the speed thereof.

Other alternative forms and embodiments of the invention may be envisaged without departing from the scope of these claims.

Thus, the twin-screw extruder may be fed directly with a rubber compound. For that, the screws are modified to exhibit an inlet and feed portion which conveys and works the compound before it arrives in the C-shaped metering chambers.

The apparatus of the invention may comprise several twin-screw extruders arranged in parallel to create a coextruded profiled product based on several non-vulcanized compounds of different composition.

In one alternative form of embodiment, the profiling device comprises one or several flow channels fed directly by a single-screw extruder and other channels fed by (two or several) positive-displacement twin-screw extruders according to the invention.

The invention claimed is:

1. An extrusion apparatus for the manufacture of a coextruded profiled element P for tires, produced from rubbery compounds of respective different compositions, the extrusion apparatus comprising:
   a profiling device comprising a plurality of flow channels and being arranged to perform profiling at the outlet of the plurality of flow channels, the plurality of flow channels being for respective rubbery compounds of respective different compositions; and
   a plurality of positive-displacement contrarotating twin-screw extruders, arranged to feed the plurality of flow channels in parallel by being juxtaposed to converge into the profiling device,
   wherein each of the plurality of twin-screw extruders comprises a plurality of screw flights which are interpenetrating and which have conjugated profiles,
   wherein the plurality of twin-screw extruders are arranged such that the plurality of flow channels receive the rubbery compounds of respective different compositions from the plurality of twin-screw extruders, respectively,
   wherein the plurality of flow channels comprises more than two flow channels, and
   wherein the plurality of positive-displacement contrarotating twin-screw extruders comprises more than two positive-displacement contrarotating twin-screw extruders.

2. The extrusion apparatus according to claim 1, wherein each of the plurality of twin-screw extruders is fed by a respective one of a plurality of secondary single-screw extruders.

3. The extrusion apparatus according to claim 2, wherein for each of the plurality of twin-screw extruders, the twin-screw extruder and the respective one of the plurality of secondary single-screw extruders are arranged in a common housing.

4. The extrusion apparatus according to claim 3, wherein for each of the plurality of twin-screw extruders, the respective one of the plurality secondary single-screw extruders comprises an outlet end which communicates with a central inlet orifice of the twin-screw extruder into an internal chamber of the twin-screw extruder.

5. The extrusion apparatus according to claim 2, wherein each of the plurality of twin-screw extruders and each of the plurality of secondary single-screw extruders has its own respective drive means.

6. The extrusion apparatus according to claim 2, wherein for each of the plurality of twin-screw extruders, an axis of rotation of the screw of the respective one of the plurality of secondary single-screw extruders is transverse to an axis of rotation of the screws of the twin-screw extruder.

7. The extrusion apparatus according to claim 1, further comprising a control unit configured to adjust a rotational speed of the screws of the plurality of twin-screw extruders to suit dimensions of the coextruded profiled element P.

8. The extrusion apparatus according to claim 7, wherein the control unit adjusts the rotational speed of the screws of the plurality of twin-screw extruders to suit operating conditions of an ancillary assembly line.

9. A method for the manufacture of a coextruded profiled element P for tires, produced from rubbery compounds of respective different compositions, the method comprising:
   feeding a plurality of compound flow channels with respective rubbery compounds of respective different compositions by a respective plurality of positive-displacement contrarotating twin-screw extruders, screw flights of which are interpenetrating and have conjugated profiles; and extruding the coextruded profiled element P through a profiling tool coming from the plurality of compound flow channels, wherein the plurality of twin-screw extruders are arranged to feed the plurality of compound flow channels in parallel by being juxtaposed to converge into the profiling tool, wherein the plurality of compound flow channels comprises more than two compound flow channels, and wherein the plurality of twin-screw extruders comprises more than two twin-screw extruders.

10. The method according to claim 9, further comprising adjusting a rotational speed of the screws of the plurality of twin-screw extruders to suit dimensions of the coextruded profiled element P.

11. The method according to claim 9, wherein a flow rate supplied by each of the plurality of twin-screw extruders is greater than 20 kg/min for a speed less than or equal to 40 rpm.

\* \* \* \* \*